March 6, 1973  J. E. PORTER, JR  3,719,181
ADJUSTABLE AND FOLDING OUTDOOR GRILL AND CRANE
Filed Aug. 31, 1971  3 Sheets-Sheet 1
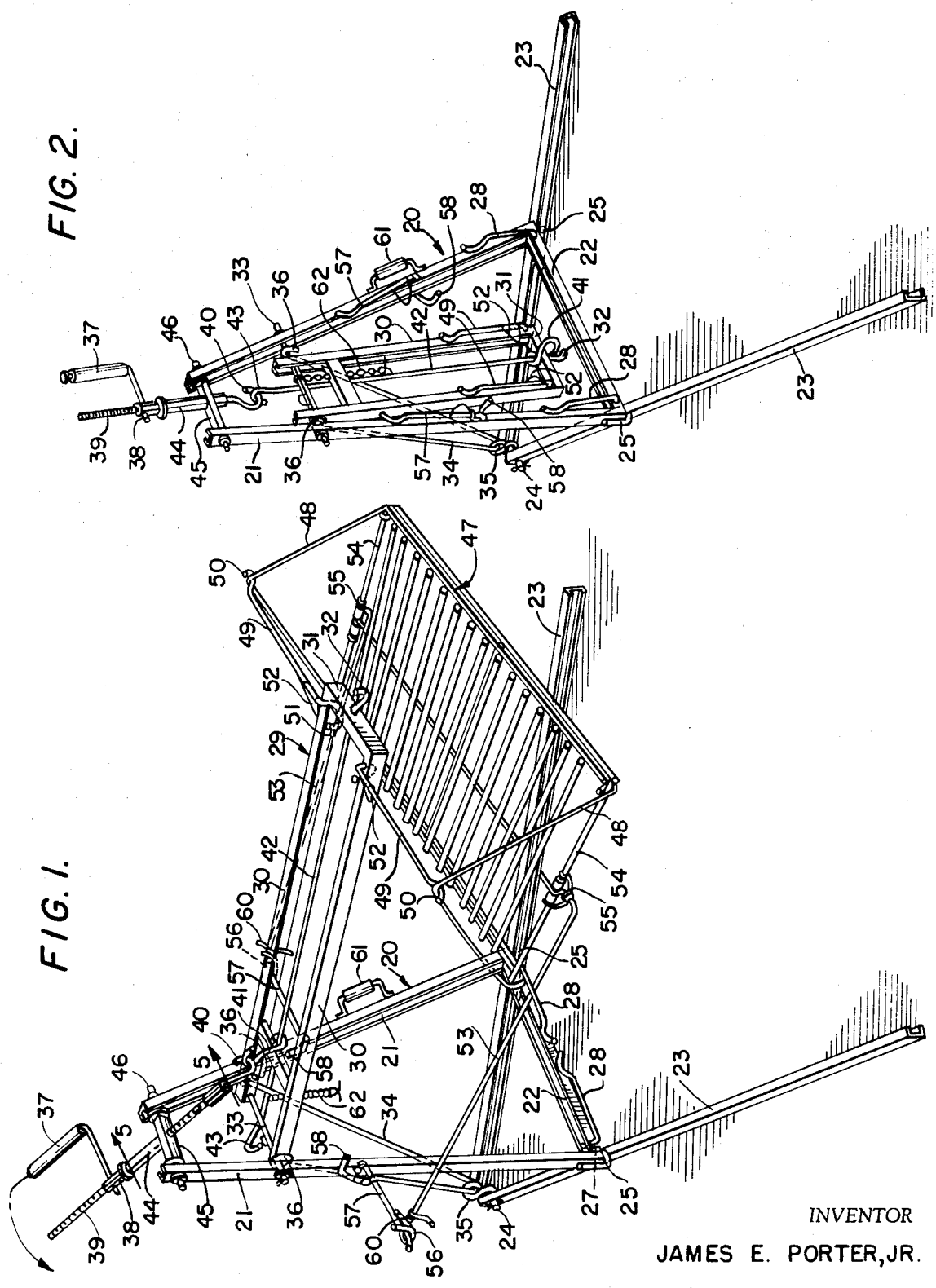
INVENTOR
JAMES E. PORTER, JR.
BY
ATTORNEY March 6, 1973   J. E. PORTER, JR   3,719,181

ADJUSTABLE AND FOLDING OUTDOOR GRILL AND CRANE

Filed Aug. 31, 1971   3 Sheets-Sheet 2

INVENTOR
JAMES E. PORTER, JR

BY
ATTORNEY

March 6, 1973     J. E. PORTER, JR     3,719,181
ADJUSTABLE AND FOLDING OUTDOOR GRILL AND CRANE
Filed Aug. 31, 1971     3 Sheets-Sheet 3
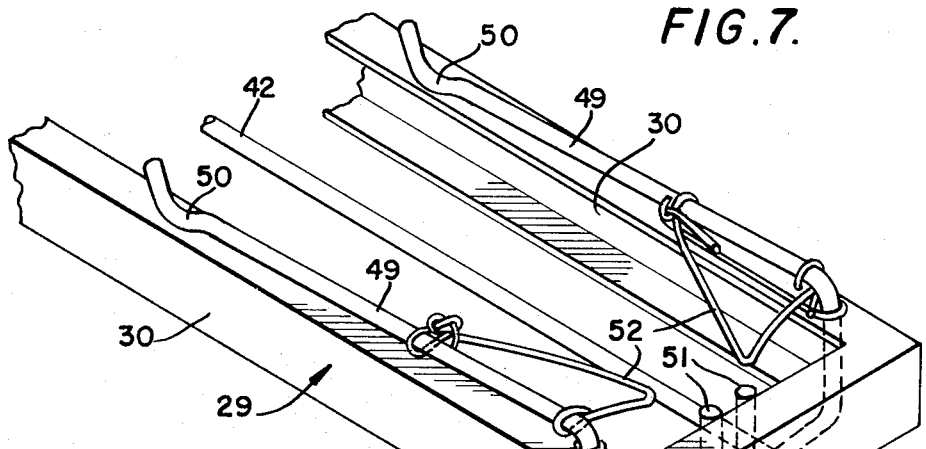
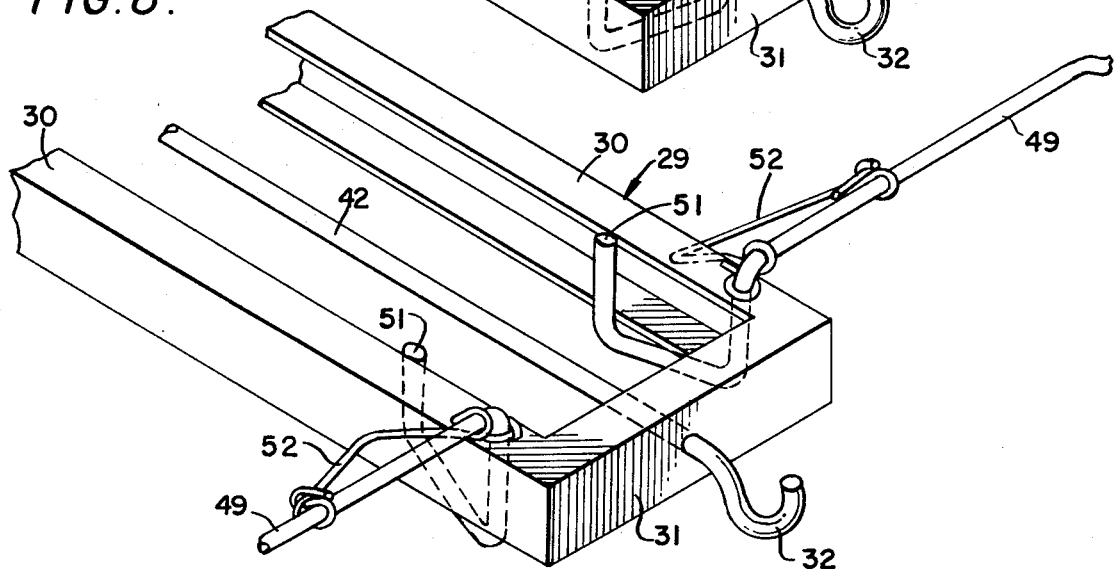
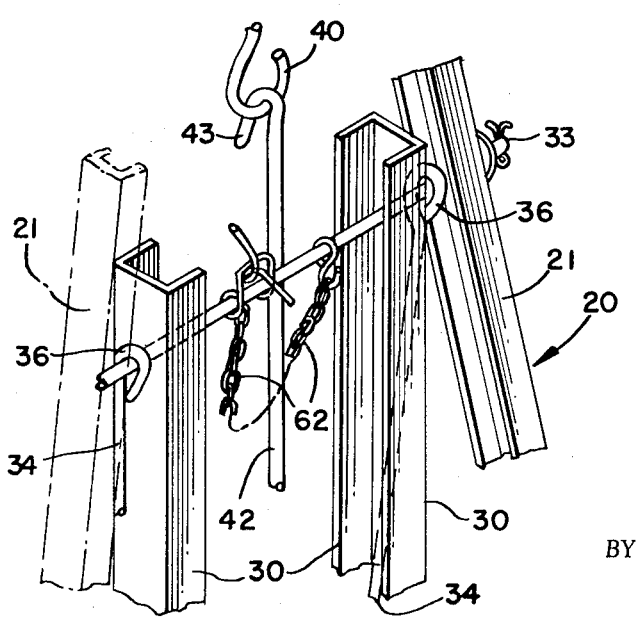
INVENTOR
JAMES E. PORTER, JR.
BY B.P. Fuller
ATTORNEY United States Patent Office 3,719,181
Patented Mar. 6, 1973

3,719,181
ADJUSTABLE AND FOLDING OUTDOOR
GRILL AND CRANE
James E. Porter, Jr., Rte. 1, P.O. Box 214A,
Lexington, S.C. 29072
Filed Aug. 31, 1971, Ser. No. 176,601
Int. Cl. F24b 3/00
U.S. Cl. 126—30                                12 Claims

ABSTRACT OF THE DISCLOSURE

A foldable crane for outdoor cooking is adjustable for supporting a grill rack or kettle at desired elevations above a fire or charcoal bed. The grill rack will remain level in all elevations due to the action of supporting and stabilizing means. The device is stable and solid when set up on the ground for usage and folds into a very compact essentially flat carrying or storing assembly.

A variety of outdoor cooking devices are proposed in the prior art including some which are of knock-down construction or foldable. Such prior art cooking apparatus has had a tendency toward one of two extremes; it either tends to be quite heavy, complicated and therefore costly, or to be too flimsy, lightweight and unstable for satisfactory usage by outdoor cooking enthusiasts. Some examples of the prior art are disclosed in U.S. Pats. 690,150; 2,604,884; 3,152,536 and 3,045,660.

The object of the present invention is to improve upon the prior art through the provision of an outdoor cooking apparatus which is versatile in its utility, sufficiently rugged and durable to be practical and reliable, economical in construction, fully adjustable and foldable into a highly compact non-use storage form. The apparatus involves a supporting crane for a kettle or food grill, which is extremely stable, and will not tilt or tip over in any normal situation.

Other features and advantages of the invention will become apparent during the course of the following description.

BRIEF DESCRIPTION OF DRAWING FIGURES

FIG. 1 is a perspective view of a cooking apparatus embodying the invention erected for use as a grill.

FIG. 2 is a perspective view of the crane portion of the apparatus in a partly folded condition.

FIG. 7 is a fragmentary perspective view of a kettle or grill support frame and associated elements in a non-use position.

FIG. 8 is a fragmentary perspective view of the same elements of the apparatus in active use positions.

FIG. 9 is a fragmentary perspective view showing the relationship of A-frame, grill support frame and associated elements in the folded position.

DETAILED DESCRIPTION

Figure 3:
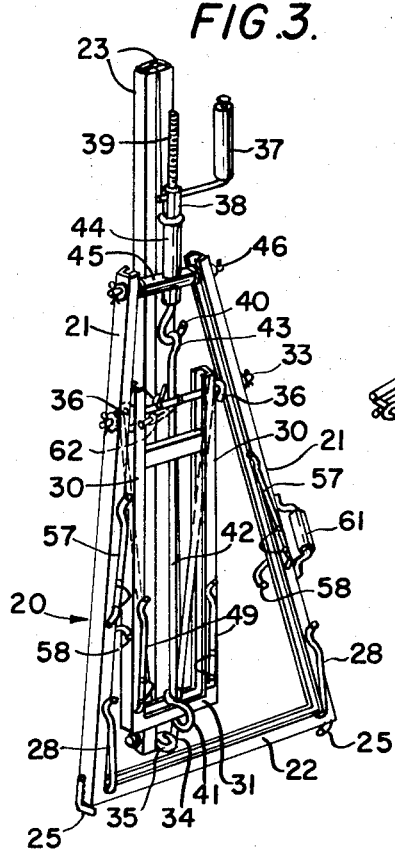
FIG. 3 is a similar perspective view of the crane in a fully folded position.

Referring to the drawings in detail wherein like numerals designate like parts, the outdoor cooking apparatus comprises an A-frame 20 which is upstanding during use of the apparatus and which comprises a pair of side bars 21 and a base transverse connecting bar 22 rigidly secured to the side bars. The base of the apparatus is formed by a pair of elongated forwardly diverging foot members or bars 23, the rear convergent ends of which are loosely pivotally connected by a short cross pin 24 held in place by cotter pins.

Figure 6:
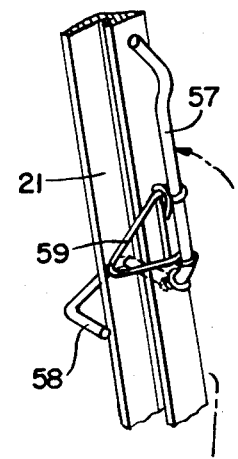
FIG. 6 is a fragmentary perspective view of an A-frame and associated elements.

To releasably lock the lower end of the upstanding A-frame 20 to the foot members 23, a pair of L-shaped locking pins 25 are welded to the bars 21 at the bottom of the frame 20 and are received within side openings 26 formed in the foot members 23. The members 23 lie directly under the base bar 22 at the lower corners of the frame 20. The foot members 23 are further releasably locked against inward movement while in the use position by pivoted stops 27 which abut the inner sides of the members 23, FIG. 1. These stops are carried by crank arms 28 on the bar 22 and these arms are utilized as shown in FIG. 6 to turn the stops 27 to raised inactive positions so that the foot members 23 can be shifted together horizontally when the apparatus is to be folded. The crank arms 28 and stops 27 are positioned in the active use positions for locking the foot members 23 at the bottom corners of the A-frame 20 in FIG. 1.

The apparatus further embodies an elongated U-shaped utensil support frame or boom 29 of welded construction which includes parallel side bars 30 and a forward cross bar 31 having a support hook 32 for a cooking kettle or the like, not shown. The boom 29 is vertically swingable during adjustment of the apparatus, as will be further described, and the rearward ends of the bars 30 are pivotally supported on the A-frame 20 near and below the top thereof by a cross pin or shaft 33. An approximately V-shaped brace 34 of heavy wire or rod stock has its lower end connected through an S-hook 35 with the pin 24 and the upper terminals of the brace 34 carry hooks 36 which pivotally receive the shaft 33 loosely.

Figure 5:
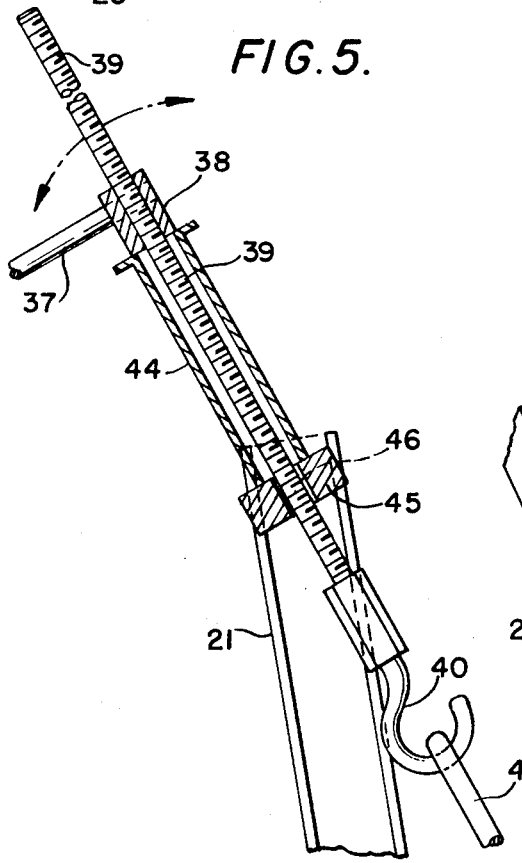
FIG. 5 is an enlarged central vertical section taken on line 5—5 of FIG. 1.

It may be seen that the elements 20 and 29 plus the base or foot members 23 constitute a supporting crane for a cooking grill or other utensil. Adjustment of the height of the cooking utensil relative to an underlying fire is achieved by an adjusting crank handle 37 which is secured rigidly to a rotary nut 38 on a non-rotary screw shaft 39 whose lower end carries a hook 40 coupled with a connector 41, in turn connected to a center longitudinal rod 42 of the boom 29, which rod may be an extension of the hook 32. The rearward end of the rod 42 is further provided with a hook 43 engageable with the hook 40 when the apparatus is folded, see FIGS. 3 and 5. A spacer sleeve 44 is intervened between the nut 38 and a crosshead 45 at the top of the A-frame 20, this crosshead being pivoted between the bars 21 by a shaft 46 or by suitable trunnions. The elevating screw 39 and associated parts pivot about the axis of the shaft 46 during operation. The crank handle 37 is thus utilized to raise and lower the forward end of the boom 29 by pivoting the boom on the axis of the shaft 33.

The apparatus further comprises a food grilling rack 47 which is rectangular and sufficiently rigid to support a variety of food items. This rack has end foldable triangular suspension frames 48 for suspending the rack in a level position from a pair of pivoted arms 49 on the leading end portion of the boom 29. The arms 49 have hook terminals 50 to engage the tops of the frames 48 and hold them. The arms 49 have stop elements 51 formed on their inner ends engageable respectively with the side bars 30 and end bar 31 of the boom 29 when in the active and foldable positions of the arms shown in FIGS. 8 and 7. To further position the arms 49 in extended use positions transversely of the boom 29, FIG. 1, downwardly biased spring locks 52 are mounted on the arms 49 near their inner ends and these elements contact the outer sides of the bars 30 to hold the arms 49 in their use positions, FIG. 1. When the arms 49 are folded along the bars 30, FIG. 7, the spring stops will assume the position shown in this figure adjacent the inner sides of the bars 30 and the stops 51 will lie against the forward cross bar 31 of the boom.

Figure 4:
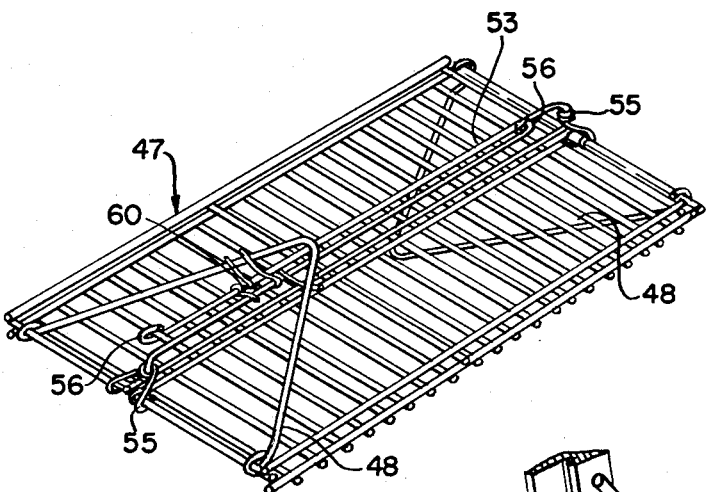
FIG. 4 is a perspective view of a grill rack in a folded condition.

The grill rack 47 further includes at its opposite sides a pair of long stabilizing rods 53 secured to the opposite side rods 54 of the rack by wire hinges 55 which have two hinge axes at right angles, enabling the rods 53 to be folded across the rack 47, as in FIG. 4, or to be unfolded and extended rearwardly and horizontally, FIG. 1, to the active use positions of the stabilizer rods. In effect, the rods 53 have universal pivotal movement through the dual axis hinges 55.

The rearward ends of the stabilizing rods 53 have hook terminals 56 which engage detachably with additional support arms 57 pivotally carried by the bars 21 of the A-frame 20 near the center of elevation of the A-frame and below the boom 29. The arms 57 have integral pivot stops 58 which swing into contact with the interior sides of the bars 21, FIG. 1, when the two arms are extended horizontally to support the rear ends of stabilizer rods 53. When the arms 57 are folded up along the bars 21 as in FIG. 6, the stops 58 assume the positions shown in that figure. The arms 57 are also equipped with spring stops 59 which are essentially the same in construction and operation as the elements 52 of the arms 49.

With the apparatus erected as shown in FIG. 1, steaks or the like may be placed on the rack 47 above a wood fire on the ground or in a suitable fire pit. The rack 47 may also be positioned at a desirable elevation above a charcoal bed in a supporting pan, not shown in the drawings. By operating the crank handle 37 to swing the boom 29 of the crane structure in a vertical arc, the rack 47 may be raised and lowered through a considerable range. Because of the stabilizing rods 53 and the parallelogram linkage which includes these rods, the boom 29 and the A-frame 20, the grill rack 47 will always remain level through its full range of vertically adjusted positions, and this constitutes a main feature of the device. The rack 47 is readily removable from the supporting crane and in its place a pot or kettle, not shown, may be hung from the support hook 32 above a source of heat. It is thought that the varied utility of the apparatus, particularly for outdoor cooking, will now be readily understood without further description.

Another important feature of the invention resides in the manner in which the apparatus folds up compactly for carrying and storage as illustrated particularly in FIGS. 2, 3 and 4. The rack 47 folds easily into a flat configuration by turning the stabilizer rods 52 on the dual axis hinges 55 to the positions shown in FIG. 4 where the two rods lie flat across the rack. The suspension frames 48 fold downwardly and are held down by keeper springs 60 mounted slidably on the rods 53. In this manner, the entire rack structure will remain folded in the condition shown in FIG. 4.

The supporting crane composed of A-frame 20, boom 29 and foot members 33 and associated parts also folds compactly to the position shown in FIG. 3, FIG. 2 depicting a semi-folded condition of the crane. More particularly, the arms 28 are shifted to the stowed positions, FIG. 6, and this allows foot members 23 to swing together around the loose connection afforded by the pin 24. Prior to this, however, as shown in FIG. 2, the hooks 40 and 41 are separated and the boom 29 is swung downwardly upon the axis of shaft 33, the screw shaft 39 now assuming a vertical position, Following this, the foot members 23 are brought together into parallelism and swung upwardly to lie substantially in the same plane as the other folded components as illustrated in FIG. 3. At this time, the hooks 40 and 43 are engaged to stabilize the folded apparatus. The A-frame 20 is equipped on one side with a carrying handle 61 enabling the entire folded crane to be transported with ease. A small securing chain 62 is also provided on the shaft 33, see FIG. 1, and this chain is utilized in the manner shown in FIGS. 3 and 9 for attaching parts in their stowed or folded positions so that the device will not accidentally unfold.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. An outdoor cooking apparatus comprising a foldable supporting crane, said crane comprising a support frame which is upstanding during use, a base for the support frame including a pair of elongated divergent foot members which underlie lower corners of the support frame and have their rear converging ends loosely pivotally connected, said foot members extending fore and aft of the support frame, means on the support frame to releasably lock the foot members to the bottom of the support frame during use of the apparatus, a utensil supporting boom pivoted to the support frame near the top thereof and projecting forwardly of the support frame, manually operable means on the support frame having a connection with said boom to raise and lower the boom in an arc about its pivotal connection with the support frame, a grill rack attachable to the boom near its forward end and raised and lowered bodily with the boom, and stabilizing means interconnecting said rack and support frame to prevent swaying of the rack and to maintain the rack level in all adjusted positions of the boom and rack.

2. The structure of claim 1, and said upstanding support frame being an A-frame having upwardly converging sides and a transverse base member forming lower corners with the sides, said lower corners resting on said foot members when the latter are in spread-apart use positions and locked by said means.

3. The structure of claim 2, and said means to releasably lock the foot members comprising pivoted lever arms on said base member having swingable stop extensions shiftable into locking engagement with the interior sides of said foot members.

4. The structure of claim 1, and said manually operable means comprising a screw shaft pivotally mounted upon said support frame near the top thereof, a driving connection between the screw shaft and said boom, a nut having threaded engagement with the screw shaft, a crank handle secured to the nut to turn it, and an abutment element engaging the nut whereby turning of the nut will produce axial movement of the screw shaft and raising and lowering of said boom.

5. The structure of claim 4, and said boom comprising an elongated U-shaped rigid frame having sides which lie inwardly of sides of said support frame so that the boom may be folded inside of the support frame and in a common plane therewith.

6. The structure of claim 1, and said stabilizing means comprising a pair of stabilizing rods pivotally secured to opposite sides of the grill rack and adapted to extend generally horizontally rearwardly of the rack, and elements on the support frame connectable with the rearward ends of said stabilizer rods.

7. The structure of claim 6, and said elements comprising a pair of pivoted arms on the opposite sides of the support frame shiftable to outwardly extending active supporting positions relative to the stabilizing rods and also being swingable to non-use positions along the sides of the support frame, and stop elements on said arms engageable with the sides of the support frame to hold said arms in said active supporting positions.

8. The structure of claim 7, and pivoted suspension elements on the opposite sides of said rack, and additional pivoted support arms for the suspension elements on said boom near the forward end thereof, the last-named arms being swingable to non-use positions along the opposite sides of the boom and said suspension elements swingable to non-use positions upon the rack substantially in the plane of the rack, and said stabilizing rods also swingable to non-use positions on the rack whereby the rack when folded has all of its components in a flat attitude.

9. The structure of claim 8, and said additional pivoted support arms having stop elements thereon turnable therewith into engagement with the sides of said boom to limit swinging movement of the additional support arms in one direction.

10. The structure of claim 9, and a hook on the leading end of said boom for the support of a pot or kettle when the latter is used instead of said rack.

11. The structure of claim 1, and a carrying handle on one side of said support frame to facilitate transporting said crane in a completely folded condition with said support frame, boom, foot members and manually operable means lying substantialy in a common plane.

12. The structure of claim 11, in a flexible element on the apparatus to lash the same in the completely folded condition.

References Cited
UNITED STATES PATENTS

| | | | |
|---|---|---|---|
| 2,604,884 | 7/1952 | Walker | 126—30 |
| 3,045,660 | 7/1962 | Manley et al. | 126—30 |
| 3,067,734 | 12/1962 | Lucas | 126—30 |
| 3,152,536 | 10/1964 | Lucas | 99—397 |

CHARLES J. MYHRE, Primary Examiner

H. JOYCE, Assistant Examiner